United States Patent [19]
Slavin

[11] Patent Number: 5,956,407
[45] Date of Patent: Sep. 21, 1999

[54] PUBLIC KEY CRYPTOGRAPHIC SYSTEM HAVING NESTED SECURITY LEVELS

[76] Inventor: Keith R. Slavin, 8474 SW. Chevy Pl., Beaverton, Oreg. 97008

[21] Appl. No.: 08/889,692

[22] Filed: Jul. 8, 1997

Related U.S. Application Data

[63] Continuation of application No. 08/742,982, Nov. 1, 1996.
[51] Int. Cl.[6] ...................................................... H04L 9/30
[52] U.S. Cl. ............................................................. 380/30
[58] Field of Search .................................................. 380/30

[56] References Cited

U.S. PATENT DOCUMENTS

| | | | |
|---|---|---|---|
| 4,405,829 | 9/1983 | Rivest et al. | 380/30 |
| 4,458,109 | 7/1984 | Mueller-Schloer | 380/30 |
| 4,514,592 | 4/1985 | Miyaguchi | 380/30 |
| 5,351,297 | 9/1994 | Miyaji et al. | 380/30 |
| 5,497,423 | 3/1996 | Miyaji | 380/30 |
| 5,519,778 | 5/1996 | Leighton et al. | 380/30 |
| 5,553,145 | 9/1996 | Micali | 380/30 |
| 5,557,346 | 9/1996 | Lipner et al. | 380/30 |
| 5,557,678 | 9/1996 | Ganesan | 380/30 |
| 5,557,765 | 9/1996 | Lipner et al. | 380/30 |
| 5,588,061 | 12/1996 | Ganesan et al. | 380/30 |
| 5,631,961 | 5/1997 | Mills et al. | 380/30 |
| 5,640,454 | 6/1997 | Lipner et al. | 380/30 |
| 5,647,000 | 7/1997 | Leighton | 380/30 |
| 5,666,414 | 9/1997 | Micali | 380/30 |

*Primary Examiner*—Salvatore Cangialosi
*Attorney, Agent, or Firm*—Bennet K. Langlotz

[57] ABSTRACT

A method of encrypted communication including creating a message and looking up a public key of a recipient. Then, encoding the message via a first encoding process using a first portion of the public key to generated an intermediate encoded message. The intermediate encoded message is encoded via a second encoding process using a second portion of the public key to generate a final encoded message. Then, the final encoded message is sent to a recipient. The public key may have a first key portion, a second key portion, and a third key portion, with the third key portion containing the encoded identity of a data element needed to decode a message encoded with the second key portion. The third key portion is encoded with the public key of a monitoring authority to enable the monitoring authority to more readily decode transmitted messages.

14 Claims, 10 Drawing Sheets

FIG. 2

| $E_{m1} =$ | $E_{m1}$ |
|---|---|
| $E_{m2} =$ | $E_{m2}$ |

| $E_{u1} =$ | $(p1 \times q1 \times p2 \times q2)$, e, $f_{e_{m1}}(p2, q2), f_{e_{m2}}(p2, q2)$ |
|---|---|
| $E_{u2} =$ | $(p1' \times q1' \times p2' \times q2')$, e', $f_{e_{m1}}(p2', q2'), f_{e_{m2}}(p2', q2')$ |
| ... | ... |
| $E_{un} =$ | $(p1'' \times q1'' \times p2'' \times q2'')$, e'', $f_{e_{m1}}(p2'', q2''), f_{e_{m2}}(p2'', q2'')$ |

FIG. 6

$E_{m1} = $ | $E_{m1}$
$E_{m2} = $ | $E_{m2}$ $E_{u1} = $ | $(p1 \times q1), e_1, (p2 \times q2), e_2, f_{em1}(p2), f_{em2}(p2)$
$E_{u2} = $ | $(p1' \times q1'), e_1', (p2' \times q2'), e_2', f_{em1}(p2'), f_{em2}(p2')$
⋮
$E_{un} = $ | $(p1'' \times q1''), e_1'', (p2'' \times q2''), e_2'', f_{em1}(p2''), f_{em2}(p2'')$

PUBLIC KEY CRYPTOGRAPHIC SYSTEM HAVING NESTED SECURITY LEVELS

REFERENCE TO RELATED APPLICATION

This is a continuation in part of U.S. patent application Ser. No. 08/742,982, entitled "Public Key Cryptographic System Having Differential Security Levels," filed Nov. 1, 1996, pending.

FIELD OF THE INVENTION

The invention relates to data communication, and more particularly to cryptography for secure data transmission.

BACKGROUND AND SUMMARY OF THE INVENTION

Electronic messages are normally transmitted between remote correspondents via a communications system typically including a network of interconnected computers. Such messages are readily intercepted and viewed by others using the network. Thus, correspondents desiring privacy may encrypt or encode a message in a way that only the recipient can decrypt or decode it to view the message contents. A common encryption technique is disclosed in U.S. Pat. No. 4,405,829 to Rivest et al., which is incorporated by reference. The technique is also known as the RSA technique.

Rivest discloses a "public key" technique in which each user desiring to receive encrypted messages creates a numerical encoding key that may be mathematically applied by a sender to an original message to encode the message. The recipient also creates and maintains secretly a decoding key that, when mathematically applied to the encoded message, decodes it to regenerate the original message. Each encoding key includes the product of two large prime numbers. These two prime factors can not be determined from their product without extraordinary computation efforts. The secret decoding key is also derived from the same two secret prime numbers. Each recipient posts his or her own encoding key in a public repository so that all correspondents wishing to send confidential messages to that recipient may use that recipient's key to encode messages. The public key repository is like a telephone directory, in that it enables anyone to look up a listed individual and obtain a number required for communication. Because of the difficulty of factoring the prime factors in a public encoding key, the decoding key remains secure to a degree.

The difficulty of deriving the secret decoding key from a public encoding key varies with the size of the key. With modest computing power, a small product of two primes may be factored by attempting to divide it by each successive prime number until division occurs without a remainder. Larger numbers require more sophisticated techniques, and as a general rule, factorization is more difficult with larger numbers. Using current technology, a public key to expressed as a string of 512 binary "one" or "zero" bits will require several thousand hours of computer time to crack by factoring, and may be considered "difficult," but not "bulletproof." A key of 1024 bits is currently considered "bulletproof' or impossible to crack; with the best available factorization techniques, it would require all global computing resources to be devoted to the task for many years. Even as computer calculation speed increases impressively, a small increase of the key size can preserve essentially absolute security of the private decoding key.

While perfect privacy may be desired by individual correspondents, there is occasionally a need for a legitimate monitoring authority to decode a message. Such authorities may include law enforcement agencies seeking evidence of criminal activity, employers seeking to investigate dissemination of trade secrets, and governments seeking to prevent espionage by the dissemination of national security secrets, including secret communications by terrorists into and out of the country. Thus, governments may limit the size of keys to ensure that decoding messages is merely difficult, but not impossible. Unfortunately, this means that users are vulnerable to decoding of their public keys and messages by the extraordinary efforts of unauthorized interceptors or "eavesdroppers". This is of particular concern as major financial transactions and sensitive technology may need to be transmitted electronically. Thus, there is a trade-off between privacy to protect efficient commerce, and decodability to ensure national security.

In current practice, there is no limit placed on the size of public keys used in domestic communications, but keys used for international communications are limited. U.S. law is believed currently to prohibit international transmission or receipt of a communication encoded with a public key greater than 512 bits in length. As a result, a commercially sensitive communication within a multinational company, but which crosses national borders, may be vulnerable to interception and decoding, or must be restricted to less efficient means of communication. If some communications are exempted from the key length limit, such as for international banking, an opportunity exists for international espionage or terrorist communications undetectable by government investigators.

Accordingly, there is a need for a method of encrypted communication including creating a message and looking up a public key of a recipient. Then, encoding the message via a first encoding process using a first portion of the public key to generated an intermediate encoded message. The intermediate encoded message is encoded via a second encoding process using a second portion of the public key to generate a final encoded message. Then, the final encoded message is sent to a recipient. The public key may have a first key portion, a second key portion, and a third key portion, with the third key portion containing the encoded identity of a data element needed to decode a message encoded with the second key portion. The third key portion is encoded with the public key of a monitoring authority to enable the monitoring authority to more readily decode transmitted messages.

BRIEF DESCRIPTION OF THE DRAWINGS

FIG. 2 is a table view of a public encoding key repository according to the embodiment of FIG. 1.

FIG. 6 is a table view of a public encoding key repository according to an alternative embodiment of the invention.

DETAILED DESCRIPTION OF A PREFERRED EMBODIMENT

Figure 1:
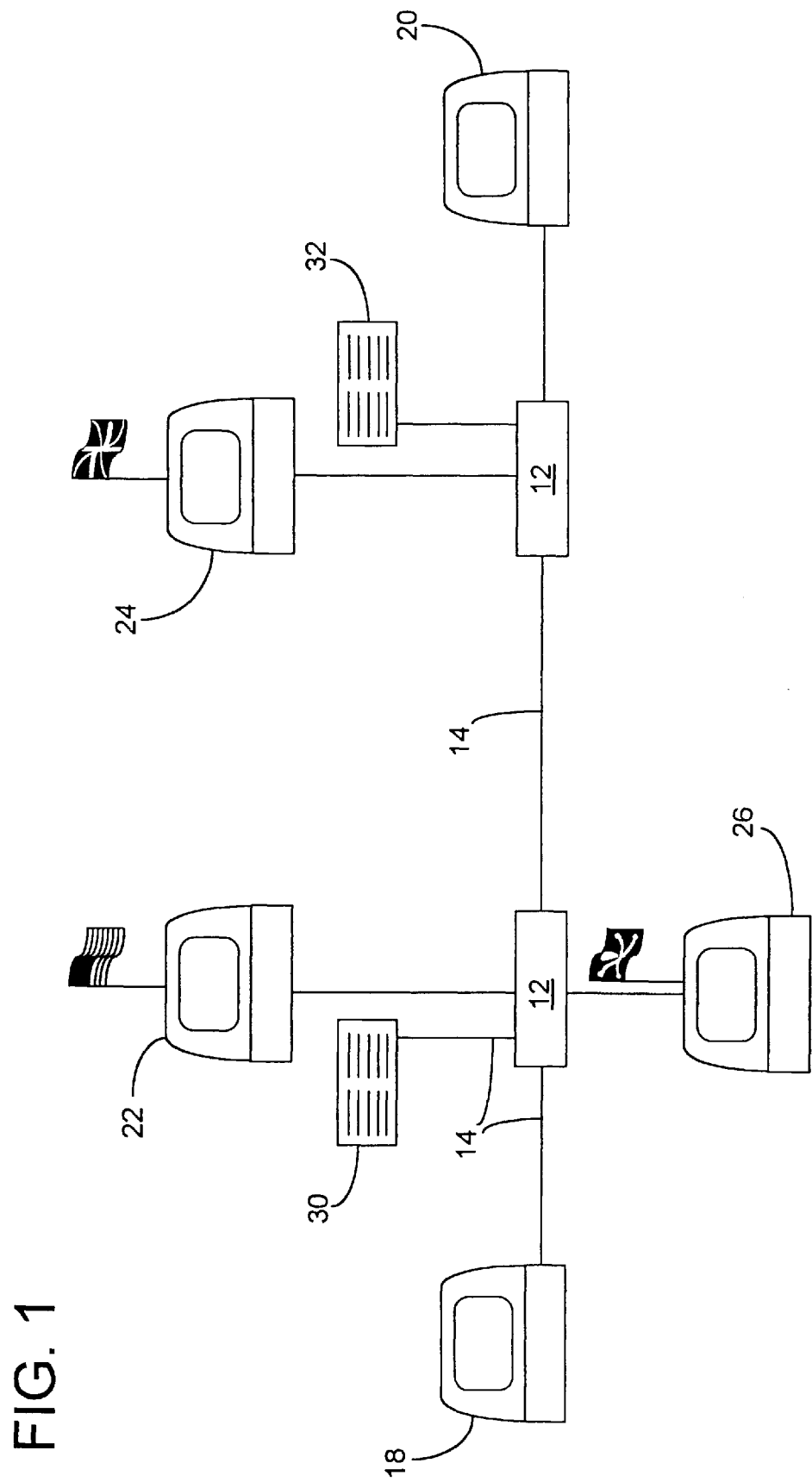
FIG. 1 is a schematic view of an electronic communication network according to a preferred embodiment of the invention.

FIG. 1 schematically illustrates a worldwide computer network 10. The network includes numerous interconnected computers 12 connected by communications lines 14, each computer being connected to at least one other computer. To provide an interface for users to communicate via the network, a plurality of terminals are connected via respective lines 14, each terminal to at least one computer 12. Shown are a sender terminal 18, a receiver terminal 20, a first monitoring authority terminal 22, a second monitoring authority terminal 24, and an unauthorized interceptor or "eavesdropper" terminal 26. While the network illustrated may be a small localized network, or a widely distributed network limited to the employees of a single organization, the example represents the Internet, with the sender and the first monitoring authority located in one country, and the receiver and second monitoring authority located in another country.

Associated with the first monitoring authority is a public key repository 30, and associated with second monitoring authority is a second public key repository 32. These preferably are maintained and controlled by the respective monitoring authorities so that they do not contain unauthorized public key information. The contents are made publicly available on a "read only" basis.

To eliminate or vastly reduce the prospect that an unauthorized eavesdropper using terminal 26 will obtain and read a message sent from the sender to the receiver, the sender typically encodes the message so that only the receiver may decode it, even though the encoded message is available to many users connected to the network, including the monitoring authorities 22, 24, and the interceptor 26. When there is a need for a monitoring authority to view message contents, such as involving transmissions to other countries, ally or adversary, the authority could require that such messages be encoded with a message that may be decoded by the authority. In an RSA public key encryption system, a key's security depends on its size. The security of such a key lies in the fact that a component of the key is the product of two large prime numbers. To decode the key, the prime factors of this product must be divined. This can require substantial computer resources, but remains feasible for some entities.

Governments may prohibit international or other messages from relying on a key having a size exceeding a certain threshold, in current practice 512 bits in length. However, this may be inadequate protection against the eavesdropper. Therefore, the preferred embodiment uses a "four-prime" technique, in which encoding keys include the product of four prime factors, two of limited size, and two of larger size. The identity of the two larger of the prime factors is readily decodable by a monitoring authority, so that the authority is then faced with merely factorizing the remaining limited-sized factors should decoding be necessary. An eavesdropper is faced with the much more difficult or impossible task of factorizing the entire product, with the two factors known to the monitoring authority being large enough to make factorization essentially impossible by any known means. The size of these two larger prime factors need not be constrained by the size limit (currently 512 bits) on their product.

The preferred embodiment uses four primes and not more, because a key of a given size will provide maximum security against interceptors when the smaller of the two primes known to the monitoring authority is as large as possible, which is the case when there are only two such known primes. Further, for a given level of decodability of the larger primes, the key size may be desirably minimized by using only two such primes. Thus, the total number of prime factors is ideally four. However, it is possible to employ more than two monitoring authority-known and/or monitoring authority-unknown primes in a functional but non-optimized system.

FIG. 2 shows the contents of the public ley repository 30 contained in at least one of the computers 12 than make up the network 10. The repository includes a plurality of public encoding keys $E_{m1}$, $E_{m2}$, $E_{u1}$, $E_{u2}$, ... $E_{un}$. Keys $E_{m1}$ and $E_{m2}$ are the public encoding keys of two monitoring authorities, and may each be created for each authority's chosen encryption system to enable encoding of messages to the respective authority. For example, these may be created using the conventional RSA public key encryption system.

Keys $E_{u1}$, $E_{u2}$, ... $E_{un}$ are the public encoding keys of potential message recipients. Each encoding key has been established by a potential recipient who wishes to have incoming messages encoded by senders who opt to do so. All of the recipient public encoding keys are generated according to the following steps, typically using different prime factors that are unlikely to have been selected by another user, owing to the multitude of available primes, and the improbability of users serendipitously adopting common factors. Each user's public encoding key contains a representation of the product "n" of four primes: $n=(p1*q1*p2*q2)$, followed by an encoding integer "e" relatively prime to the Euler phi function: $phi(n)=(p1-1)*(q1-1)*(p2-1)*(q2-1)$, followed by at least one instance of the encoded identities of primes p2 and q2. Two instances are shown in the illustration. These final encoded portions:

$$fe_{m1}(p2, q2), fe_{m2}(p2, q2)$$

are encoded using the encoding keys $E_{m1}$ and $E_{m2}$ of the monitoring authorities to which the sender and/or receiver are subject, so that only those authorities may enjoy the substantial advantage at decoding a four-prime encoding key and associated messages, as compared to an unauthorized eavesdropper, who must factorize all four factors, including the impossibly large p2 and q2 (or face the essentially impossible task of decoding the monitoring authority's robust public encoding key,)then factor the remaining two limited-size primes (p1 and q1) of the recipient's encoding key. Each final encoded portion of a user's public encoding key provides an independent means for a different authority to easily determine the identities of the prime factors p2 and q2. If a message is subject to numerous monitoring authorities, numerous encoded final portions may be included in the public encoding key.

By this method, a user may select a key with two or more prime factors of large size limited only by the personally preferred level of time required to decode each incoming message, while permitting the monitoring authority to readily decode, but with a time and resource requirement (to decode the remaining two limited-size factors p1 and q1) that may be established openly and democratically, based on a society's balanced needs for privacy and security. Preferably, the product of the pair of primes p2 and q2 is substantially larger than either of primes p1 and q1. Accordingly, in the preferred embodiment, the product of p2 and q2 is larger than the product of p1 and q1. Preferably, the product of p2 and q2 is substantially larger than the product of p1 and q1, making it significantly more difficult or impossible for an unauthorized party to factorize the product. In the preferred embodiment, the product of p1 and q1 is limited by governmental regulation to 512 bits long, while the product of p2 and q2 has at least 50% more bits, making factorizing essentially impossible. Under current requirements, the substantial resources required to decode the two limited-size factors p1 and q1 would serve a deterrent to excessive governmental intrusions on communication privacy.

A dual level security system might be established in which each correspondent secretly registered a key with the monitoring authority, conveying two of the factors in a four prime system. However, this is cumbersome, creates the opportunity for such communications to be intercepted, and makes compliance checking difficult. The preferred system enables different levels of security for different entities, while all keys are public; confidential communications are not required, either to register an encoding key, or to ensure compliance. A monitoring authority may monitor compliance simply by reviewing each individual public key listed in the registry, decoding the encoded identities of p2 and q2, calculating a remaining product "W" by dividing the four-prime product n by the decoded factors: $W=n/(p2*q2)$, and ensuring that W is an integer (actually equal to $p1*q1$) and complies with the established size threshold.

Figure 3:
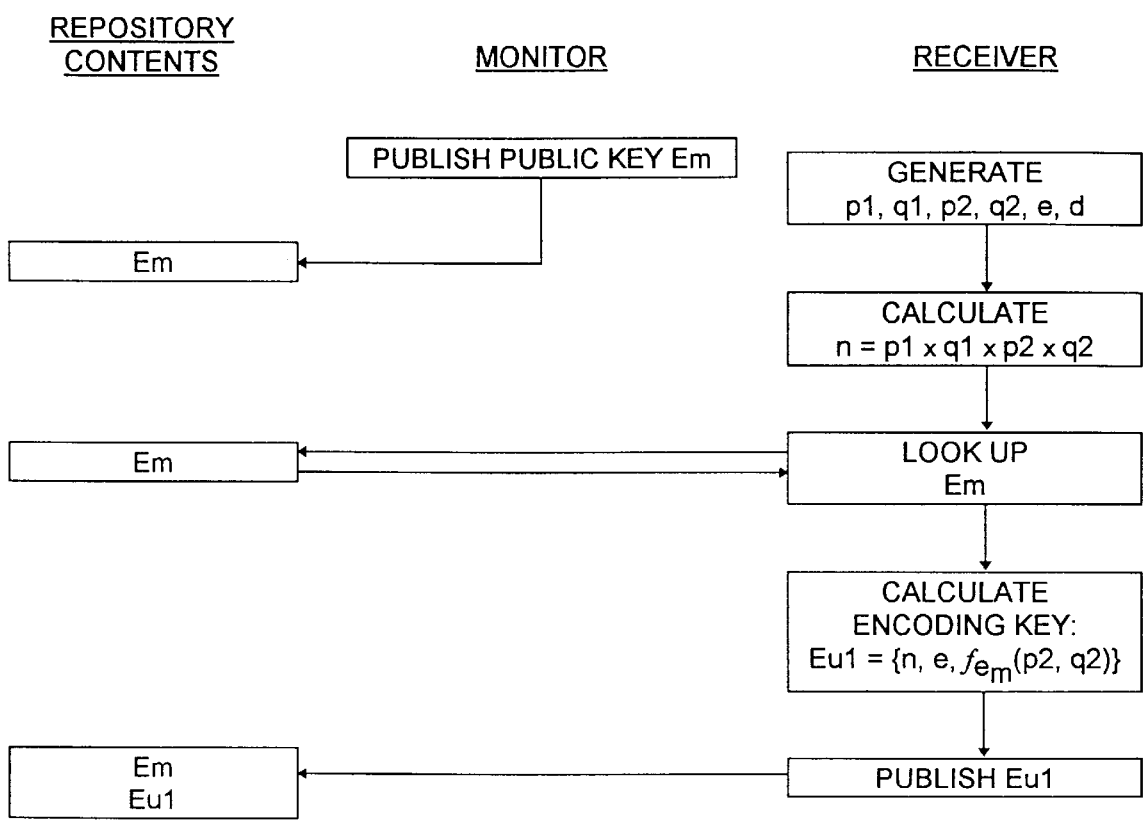
FIG. 3 is a flow chart illustrating a method of operation of the embodiment of FIG. 1.
Figure 4:
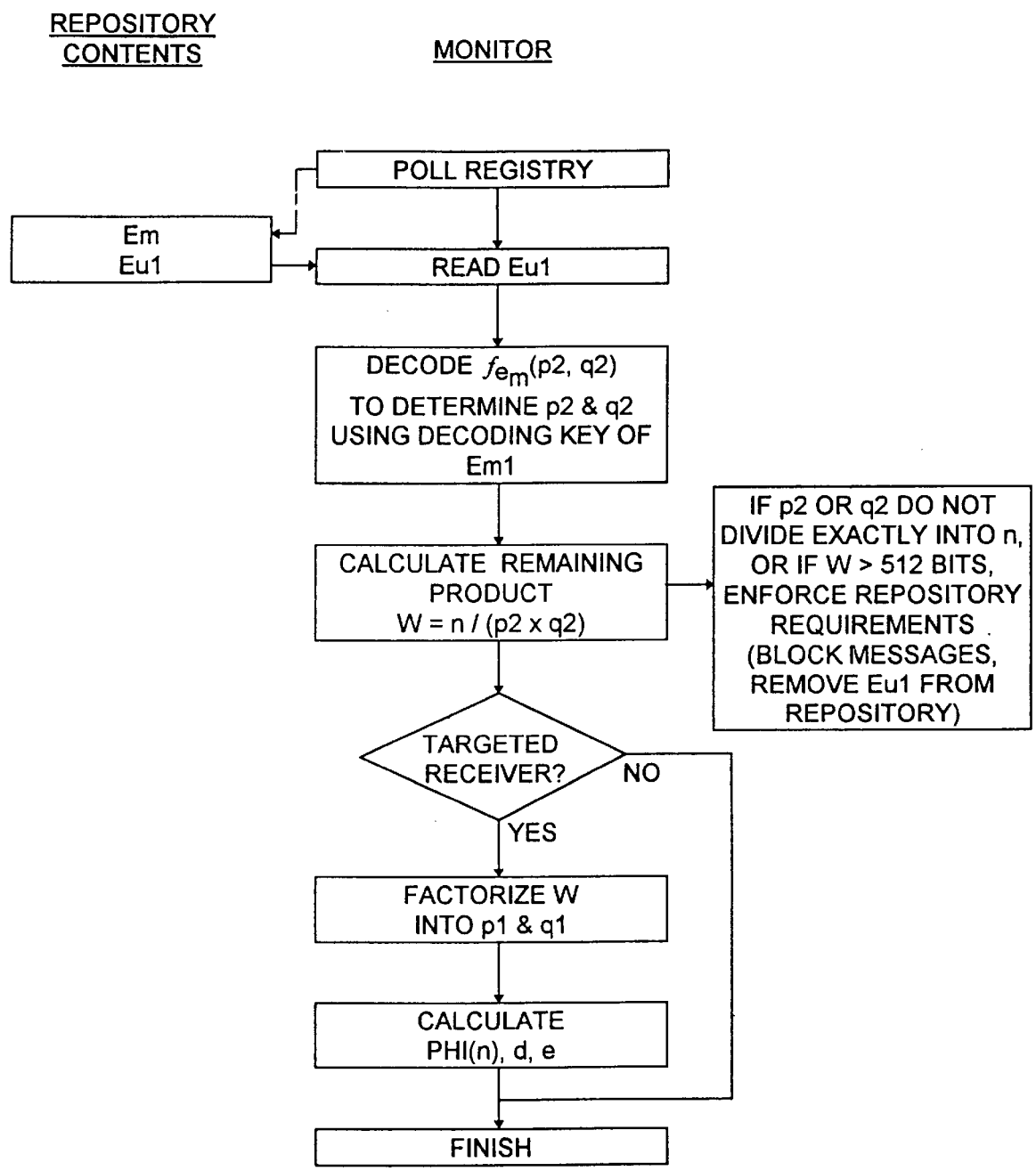
FIG. 4 is a flow chart illustrating a method of operation of the embodiment of FIG. 1.

FIG. 3 illustrates the steps required for the sender to send an encoded message to the receiver, and includes the steps for a monitoring authority to check compliance of the message and to decode the message.

First, the monitoring authority creates a monitoring authority public encoding key $E_m$ as discussed above, and publishes it in the repository 30 for all to see.

Meanwhile, the receiver creates an encoding key $E_r$ by randomly selecting or generating four primes numbers, looking up the encoding key $E_m$ for the monitoring authority or authorities regulating communication within the receiver's jurisdiction, and calculating the key as described above. This includes encoding the identities of the two larger primes p2 and q2 by applying to them the monitoring authority's public key encoding function $fE_m$ to generate the encoded message:$fE_m(p2, q2)$. The receiver then publishes his encoding key in the repository.

After composing a message intended for the receiver, the sender looks up the receiver's public encoding key in the repository, and uses it to encode the message by an encoding technique as described below in the Detailed Additional Description and in the patent incorporated by reference. The sender may then send the encoded message. Unless the message is halted by the monitoring authority for compliance checking or decoding, it is delivered to the receiver, who may decode it the decoding technique as discussed herein.

Meanwhile, the monitoring authority may check the compliance of the receiver's public encoding key and that of any others listed in the registry, even before any messages are sent to the receiver. In some applications, the posting of such public keys may be controlled by the monitoring authority so that non-complying keys are not posted, or so the newly posted keys are automatically compliance checked by the monitoring authority, allowing the monitoring authority to be alerted if a non complying key is posted. Such procedures are discussed in greater detail below.

To check compliance, for each key the authority decodes the final encoded portion $fe_m(p2, q2)$ of the user's key using a monitoring authority decoding key associated with the monitoring authority encoding key. If it is possible to decode this portion of the receiver's key, and this results in two or more prime numbers that are factors of the product in the first part of the key, the decoded factors are factored out of the product to determine a the remaining product W equal to the product of primes p1 and q1, which were not decoded. For compliance, this sub-product must be less than or equal to a certain length. With current technology, a sub-product string length of 512 bits or less is considered compliant, as discussed above. Should the monitoring authority wish to decode a message, it may undertake the substantial task of factorizing the remaining product W into its two factors (p1) and q1), permitting decoding by the conventional technique discussed below. This factorizing requires substantial computer resources to be allocated for a considerable time. Once the decoding key is known for a given receiver, decoding of future messages to the same receiver may be conducted without difficulty.

If the monitoring authority has gone so far as to obtain p1 and q1, then it may also opt whether to decode a message without delaying its transmission, or to block and hold a message before reading it to determine whether it is permissible to be read by the receiver. A message including illegal material may be considered not in compliance, and messages encoded with non complying keys that may have been privately transmitted to a sender may be blocked, even if the message is not decodable due to the non compliance.

To decode the message, the receiver has created a decoding key as a function of the prime factors used to create the encoding key. Creation of the decoding key and decoding of the message proceed by the methods discussed below.

Detailed Additional Description

Outline of the RSA Technique (U.S. Pat. No. 4, 405,829)

For a receiver to set up a public key:

1. Pick two different primes, p and q.
2. Calculate $n=p*q$, and $phi(n)=(p-1)*(q-1)$ where $phi(n)$ is the Euler Totient Function.
3. Find a value "e" relatively prime to phi(n), i.e. such that the Greatest Common Divisor (GCD) of phi(n) and e is 1. The public key is established as {n,e}, which is placed in a public repository for all to see, and which may be added to communications as part of an electronic "signature" so that replies may be encoded.
4. Find "d" such that $(d*e)$ mod $phi(n)=1$, i.e. $d*e=k*phi(n)$ for some integer k, $0<k<phi(n)$. {n,d} is the private key for the receiver known only to himself.

For a sender to send a message to the receiver:

5. The sender looks up the public key of the receiver and composes a message "m" as a pattern of binary bits, such that if we view "m" as a numeric value, then $0<=m<n$. If the message is longer, it can be split into separate sub-messages m1, m2, etc., and the method applied separately to each sub-message.

The sender then calculates $c=(m)^e$ mod n, using e and n from the public key. The expression $(m)^e$ mod n is the so-called "power-mod function". Note that $0<=c<n$, and that for m1, m2, etc., each has a corresponding c1, c2 . . .

6. The sender sends the encrypted message "c" to the receiver by any means (usually over an electronic network.)

For the receiver to decode the message "c" back to "m":

7. On receipt of "c", the receiver calculates:

$$= ((c)^d) \bmod n \quad \text{(from the private key of the receiver)}$$
$$= (m^{(d*e)}) \bmod n \quad \text{(mathematically equivalent from coding)}$$
$$= m^{(k*phi(n)+1)} \quad \bmod n$$
$$= m \bmod n \quad \text{(from the Euler Totient function properties)}$$

so the receiver recovers the original message "m" sent by the sender.

The difficulty of the monitoring authority and the eavesdropper in decoding an encrypted message are dependent upon factorizing the public key value "n" into its two prime factors. Any of these parties that factorize "n" into "p" and "q" are able to read messages intended for the receiver, by decoding in exactly the same way as for the receiver.

The difficulty in decryption by the eavesdropper lies in making the prime factors of "n" very large. The difficulty of factorization is governed by the size of the smallest prime, so primes of similar sizes are chosen to achieve maximum security for a given number of bits (which represent "n" in binary form). The total number of bits representing "n" should be kept minimal for the security level desired (while anticipation some improvements in the ability to factorize and decrypt messages by the eavesdropper), because the larger "n" is, the longer messages take to encrypt by the sender and decrypt by the receiver, even when the primes p and q are know to the decoder. For a given maximum n, this also explains why the use of more than two prime factors would result in smaller primes with less security.

Limitations of the RSA Technique

A monitoring authority may require "n" to be small enough to allow it to decode the message in a "reasonable" amount of time, but such a restriction also allows simpler decoding by the eavesdropper, which may not be acceptable to the sender and the receiver. The question of what is an "acceptable" amount of decoding time should ideally be a negotiation between the receiver (i.e. any legitimate receiver of encrypted information,) and the monitoring authority. Consideration of the eavesdropper by the receiver and the monitoring authority need not be part of the negotiations. Ideally the receiver (who ultimately selects his own public key, and therefore the security of messages sent to him) should be able to make decryption arbitrarily more difficult for the eavesdropper.

A Preferred Embodiment

The preferred method relates to providing simpler decoding for the monitoring authority without compromising security to the benefit of other parties such as the "eavesdropper." The RSA technique does not allow different decoding for the monitoring authority and the eavesdropper (i.e. only the sender, the receiver, and the eavesdropper are involved.)

The preferred embodiment follows the steps:

1. Instead of two primes as used in the RSA technique, we use four randomly selected primes, p1, q1, p2, q2, all of different values. We calculate:

$$n = p1*q1*p2*q2$$

2. From the definition of phi(n) we get for these four primes:

$$phi(n) = (p1-1)*(q1-1)*(p2-1)*(q2-1)$$

The other encryption and decryption steps are essentially the same as the existing RSA technique for the sender, and the receiver. It is notable that the use of four primes is counterintuitive to the concept of increased security. In conventional two-prime systems with a key of a given size, security is a function of the size of the smallest prime factor. Increasing the number of factors would substantially reduce security for a given key size.

3. The monitoring authority must have a public key of its own, possibly using the "RSA" technique or any public key encryption system, including the four-prime system. This requirement is different from the standard RSA technique. When the receiver wishes to register his public key in a public key repository, he finds {n,e} as described for the "RSA" technique but using four primes as described above. In addition the receiver encrypts two of his four primes, p2 and q2 using the monitoring authority public key, into a message "g". Then {n,e,g} are placed into the public key repository under the receiver's name.

4. When the sender encrypts a message to send to the receiver, the sender looks up the receiver's encoding key in the repository, and extracts "n" and "e" for encryption, but cannot interpret the "g" part of the public key of the receiver 5. The sender then encrypts the message using the encoding technique common to "RSA" and the four-prime technique, and encapsulates the encoded message with the {n,e,g} public encoding key of the receiver. The sender then sends the resulting encoded message to the receiver.

6. If the monitoring authority is able to intercept the message (with the encapsulated public key of the receiver), it can retrieve {n,e,g}, and using its private key, decode "g" to give p2 and q2. It can then calculate n/(p2*q2)=W and check that W (=p1*q1 from above) is less than some length limit (in bits) required by the monitoring authority of the receiver. If p2 and q2 do not both divide into "n" exactly, or if W is outside the required size limit, then the message is deemed to be noncompliant, with the receiver in violation (not the sender, who is after all, just automatically using the public encoding key of the receiver, probably with software that can not detect violations). In other words, it is the responsibility of the receiver, when generating their public key, to make sure that the key complies with the requirements of the monitoring authority.

7. If sufficient real-time processing is available, and if the monitoring authority can route messages through its system before relaying the message to the receiver, then the monitoring authority can block violating messages from ever reaching the receiver. If delays are unacceptable, messages can be stored for subsequent non-real-time analysis to look for noncompliant public keys.

8. If the monitoring authority wishes to decode the message, it must find the prime factors of "W", or p1 and q1 using factorization techniques. The problem of factorization is most difficult when p1 and q1 are both about equal in size. The monitoring authority sets the number of bits size limit of W=p1*q1 such that the receiver feels that the monitoring authority has to do a difficult factorization to decode the message, and that the monitoring authority is not able to capriciously decode any or all messages, and yet with some reasonable effort, the monitoring authority can factorize W into p1 and q1, and therefore decode the message.

9. If the message sent by the sender to the receiver is intercepted by the eavesdropper, then for the eavesdropper to decode the message, he must factorize "n" into all four prime factors, p1, q1, p2, q2. If the monitoring authority can find p1 and q1 with a "reasonable amount" of computation, then so can the eavesdropper, but the eavesdropper doesn't know p2 and q2, so these primes can be made much larger than p1, q1, effectively barring further progress on decryption of the message by the eavesdropper. For maximum encryption effectiveness, the magnitudes of p2 and q2 should be comparable.

10. The public key of the monitoring authority has been used to encrypt all the p2 and q2 values in the public key repository, so for security against decoding by the eavesdropper, it is recommended that a very secure key be used by the monitoring authority.

11. The monitoring authority can scan the public key repository, and determine whether a public key {n,e,g} is legal (using the technique above in step 6 above), or even go further and factorize the remaining primes p1 and q1, allowing the monitoring authority to rapidly decode all messages intended for the receiver (just as the receiver would decode his own messages). This can be done in advance of transmission or receipt of a message using the public key in the repository, without having to wait for the public encoding key {n,e,g} of the receiver to arrive encapsulated into a message.

12. Two monitoring authorities 22 and 24 can each have authority over their respective repositories 30, 32, such that the receiver would:
   a) generate "g1" from p2 and q2 and the public key of monitoring authority 22, and place {n,e,g1} in repository 30,
   b) generate "g2" from p2 and q2 and the public key of monitoring authority 24, and place {n,e,g2} in repository 32.

Typically, the two monitoring authorities 22 and 24 might be at the sending and receiving end of a message between the sender and the receiver.

The sender would then encode a message by reading the public key repositories of the receiver in the repositories for the sending end and the receiving end, and then encapsulating {n,e,g1,g2} with the encrypted message. This would allow the two monitoring authorities 22 and 24 to decrypt the message sent, using the method required. Each monitoring authority could try both values of "g" to see which decoded message made sense, or additional identifying text information "i" could be placed with the public key to say which the monitoring authority the value of "g" can be decoded by.

13. The four-prime encryption technique is slower than the RSA technique for encryption and decryption, but as most such encryption schemes are merely used to send a session key to a conventional coding technique (not public key) such as DES, IDEA, RC2, RC4, RC5, the slowdown should be acceptable, particularly if specialized hardware for performing the "power-mod" function is provided.

The same magnitudes of the primes p1, q1 for the four-prime technique compared against "p", "q" for the RSA technique gives equal levels of security against the monitoring authority.

14. Four-prime decryption may be performed more rapidly using a 4-residue number system where each modulo is one of the public key primes, as in the well known Chinese Remainder Theorem.

15. The disclosed technique and system preferably employ keys using products of four prime numbers. The use of more than four primes factors will increase key size without necessarily improving security. The use of fewer than four will reduce protection against inappropriate decoding by an eavesdropper. Using only two large primes and encoding their identities with the monitoring authority public key would provide unlimited protection against other eavesdroppers, but would have the unfortunate result of making governmental monitoring of many or all citizens' electronic communications trivially simple. The potential for abusive intrusions on privacy would make such a system unacceptable in a free society.

Procedure for Changing Public Keys

In a public key system, users may need to change their public keys occasionally. Three reasons are:
   a) They have reason to believe their key has been broken (compromised).
   b) Their computer system (with its private key) has been stolen.
   c) Increasing computer power will soon make their key size obsolete.

A possible monitoring problem arises from key changes. With the four-prime scheme, if a receiver keeps changing his public key, and that receiver is targeted for full decoding by a monitoring authority, then the monitoring authority would have to keep re-factorizing W=(n/(p2*q2)) to obtain the prime factors p1 and q1, which means that during that period they would be unable to read the messages sent to the targeted receiver.

To avoid this problem, the monitoring authority can insist that all new public keys maintain the values of the p1 and q1 factors for at least an extended period of time. A receiver may be permitted to regenerate new public key values of p2, q2, e, and g (the monitoring authorities coded version of the two prime factors p2 and q2). This allows the monitoring authority to carry on decoding messages to a targeted receiver without any break of continuity. If such a break occurred, potentially damaging messages could be sent to the targeted receiver while the monitoring authority is unable to decode the message until the new p1 and q1 were obtained (which may take some time).

The monitoring authority can check compliance with the requirement that p1 and q1 are preserved by insisting that the custodian of the public key repository send the proposed new key, and (if it is a key change rather than a first key) the corresponding old key.

The monitoring authority then checks the remaining product W to ensure that:

$$W(\text{old}) = W(\text{new})$$

If not, the new public key is noncompliant, and could be held in violation by the monitoring authority, and the reply to the waiting repository would be an application denial. Note that this test does not require that the monitoring authority actually conduct the arduous task of factorizing to obtain p1 and q1. Therefore, this test may be applied uniformly to all new key change requests from targeted or untargeted receivers, without a substantial investment of resources.

To avoid bottlenecks that might occur were the monitoring authority compelled to delay replies for confirming key changes, a preferred embodiment would allow the monitoring authority, at its convenience (on or before the effective date) to send back a message to the repository containing the new public key with two additional fields containing:

a) the effective date on or after which the key can be used.
  b) The monitoring authority signature of all the other fields in the public key (including the effective date above).

Note that section b) allows the repository to check that the message is from the monitoring authority, and further allows the monitoring authority to later poll the repository and check that no tampering has occurred en-route or by an improperly operated repository.

The repository could then either wait until this effective date was reached and then replace the corresponding old public key with the new public key, or immediately place the new key into the main repository and move the old key into an archive database (which may have to be used until the new key is effective).

A new receiver (with no old key) that is targeted by the monitoring authority, may cause the monitoring authority to delay the effective date of a new public key to the repository until it has factorized W to p1 and q1. So that individuals targeted for scrutiny are not alerted to this fact, a standard minimum delay may be implemented in all first key applications.

When a sender send a message to a receiver, the mth monitoring authority can now check their parts of the message (i.e. n, e, i_m, g_m, effective_date_m) with their signature for tampering. They can also check that the effective date is on or earlier than the current date. They can then perform the other standard checks, such as confirming W=n/(p2*q2).

There may arise an occasional need for a receiver being able to change the p1 and q1 components of their key. For example, a new size limit on the product of p1 and q1 might be established by the monitoring authority, which could allow or compel the receiver to change that part of the key size. Presumably, given the larger sizes of p2 and q2, which provide essentially all the security against unauthorized eavesdropping, there may be no other logical reason for a receiver to change p1 and q1, unless p1 and q1 become publicly known and therefore known to the monitoring authority.

The ability to change p1 and q1 can be limited by setting a date before which p1 and q1 may not be modified. This feature can be supported by adding a "modifiable_p1_q1" date field to the public key. Once the modifiable_p1_q1 date has arrived, the receiver is at liberty to submit new public key values of p1 and q1, (as well as p2 and q2, where unscheduled changes are always possible), and other corresponding values in their public key.

The modifiable_p1_q1 date field should also be included in the signature mentioned above, otherwise it could also be tampered with before being placed in the repository.

For applications involving changes in p1 and q1, (subject to standard checks to find W), the effective date can be the later of the old modifiable_p1_q1 date and the current date, plus a minimum delay required by the monitoring authority for possibly factoring W into p1 and q1.

If there are no changes detected in p1 and q1, the old modifiable_p1_q1 date is automatically sent back as the new modifiable_p1_q1 date for updating the repository. The effective date can be set to the current date to be enabled immediately at the repository. This procedure maintains the true p1 and q1 modifiable_p1_q1 dates through any number of receiver-driven changes to their public key.

Preferred and Alternative Embodiments of the Invention

Paragraph 1. A method of generating an "RSA"-type public key comprising:

a) using four distinct primes: p1, q1, p2, q2, instead of two for the prior method,
  b) Encrypting two of the four primes, p2 and q2 using the public key of a monitoring authority, into a value "g" such that only the monitoring authority can decrypt and read the value of these two primes.
  c) Constructing a public key, which in addition to the two numbers {n,e} used for "RSA" technique, the key also comprises of the value "g". The message {n,e,g} comprises the new public key.

Paragraph 2. A method of message encryption comprising:

a) extracting the values {n,e} from the public key of the recipient of the message,
  b) using the "RSA" technique, by coding a message "m" using:

$$c=(m)^e \bmod n$$

c) Including plain-text identification "i" of the monitoring authority whose public key was used to encrypt p2 and q2 in Paragraph 1, step (b)
  d) combining {c,n,e,i,g} into an encapsulated message, such that the values i, n, e, are directly readable by anyone who intercepts the message, although the encrypted message part "c" and "g" are not thus readable.

Paragraph 3. A method for a monitoring authority to verify a public key as compliant in a repository in its jurisdiction, and message compliance within its domain, comprising:

a) extraction of "g" and "n" from a public key in its repositories, or by extraction from an intercepted message,
  b) decoding "g" using its private key, so obtaining p2, q2. It can then check that:
  c) The values p2 and q2 both divide exactly into the corresponding "n".
  d) The value W=n/(p2*q2) is itself within a prescribed size limit defined by the monitoring authority.

Paragraph 4: A method for a monitoring authority to decode a message comprising:

a) Finding W=n/(p2*q2) as noted in paragraph(3),
  b) finding the factors of W (p1 and q1) using any known prime factorization technique,
  c) Finding phi(n), (p1−1)(q1−1)(p2−1)(q2−1), d, e mod phi(n)=1 and "d" such that $$(c)^d \bmod n = m^{(d*e)} \bmod n = m$$

d) Determining the original message.

Paragraph 5: A method of encrypting for more than one monitoring authority with jurisdiction over a message, comprising:

a) automatically collecting the public keys of the recipient in the relevant jurisdictions of the message (usually the sender and receiver, so the jurisdictions are known),
  b) verifying that the values of n,e are equal in each public key repository so obtained in (a) above for the recipient of the message, c) encrypting the message as in Paragraph 2, but with the information:
{c,n,e,i1,g1,i2,g2 . . . } for however many monitoring authorities required.

Paragraph 6: A. method of decryption for each monitoring authority comprising:
a) extracting the plain text identifying the monitoring authority "i" as in Paragraph b 2(c), and thereby obtaining the corresponding "g", (the recommended method), or by testing for compliance using each "g" in the header as in Paragraph (3),
b) verifying that at some point it could decode the message completely, comprising method (4), if required.
c) treating any message failing to include all the required information required by that monitoring authority as not in compliance.

The disclosure is made with reference to preferred and alternative embodiments, but the following claims are not intended to be so limited.

Additional Alternative Embodiment

An important variation on the encryption system disclosed above uses two stages of nested public key encryption, instead of a single-stage of public key encryption where all the private key factors are combined. In the "nested" system, a message is encrypted using a first public key encryption system to generate an intermediate encrypted message, which is then encrypted again using a second public key encryption system and transmitted via a non-secure public network. The recipient may decode the transmitted encrypted message using a decryption process compatible with the second encryption system to yield the intermediate encrypted message, then decode the intermediate encrypted message using a decryption process compatible with the first encryption system to yield the original message.

In this embodiment, the first and second public key encryption systems may be of any type, and may be different from or similar to each other in any respect. To provide the differential security levels discussed above to distinguish between legitimate governmental law enforcement and unauthorized interception, the two systems have different magnitudes of security. One of the systems should have a significantly higher security level to prevent all unauthorized efforts at decryption, except by an authority who is provided with the means to readily decrypt that system, such as by a user's public key including a term that allows the derivation of the private key of that system which is encoded in the authority's own public key, as discussed at length above.

The derivation of the private key may be the private key itself, or more preferably, information that would allow the simple recovery of the private key in such a manner as to verify that the derived private key does indeed correspond to the public key. For example, in the RSA encryption technique, such information could be derived from the public key information, and from one of the two prime factors.

As shown in FIG. 6, the contents of the public key repository are similar to those discussed in the preferred embodiment above, except that the users' keys Eu1, Eu2, etc. are differently formulated. In this embodiment, each stage of the two stage encryption is by RSA public key cryptography. Each user key includes:

a term n1 equal to the product of prime factors p1 and q1, followed by an encoding integer e1 relatively prime to the Euler phi function Phi(n1)=(p1−1)*(q1−1), followed by term n2 equal to the product of prime factors p2 and q2, followed by an encoding integer e2 relatively prime to the Euler phi function Phi(n2)=(p2−1)*(q2−1), followed by at least one instance of the identity of one of the numbers needed to readily decode one of terms n1 or n2 as encoded using the encoding key Em of a monitoring authority.

In this instance, there are two such final terms, each for a respective monitoring authority in the sending and receiving jurisdictions. Each final term includes the decodable identity of the factor p2, enabling the authority to decode a message encoded with term n2. In the preferred embodiment, the n1 term has a limited size of 512 bits, for example, while the n2 term may have greater length without legal limit.

Figure 7:
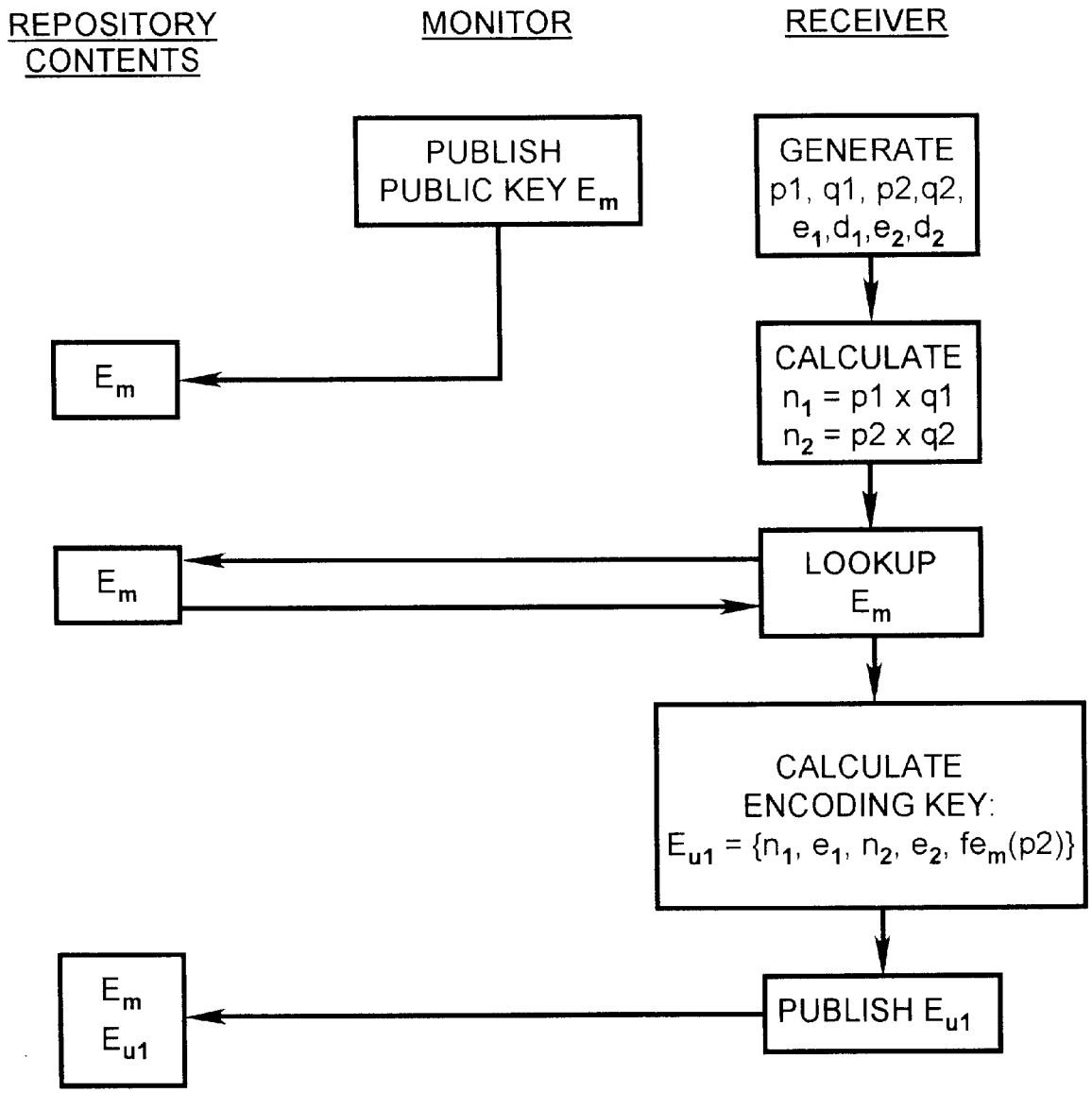
FIG. 7 is a flow chart illustrating a method of operation of the embodiment of FIG. 6.

FIG. 7 shows the steps by which the contents of a public key repository are established to enable operation of a communication network using nested public key encryption. The steps proceed the same as discussed above with respect to FIG. 3, except that the receiver generates terms e1 and d1 for only the first pair of prime factors, and generates additional terms e2 and d2 for the second pair of prime factors, then calculates two products n1 and n2, and generates an encoding key as noted above with respect to FIG. 6.

Figure 8:
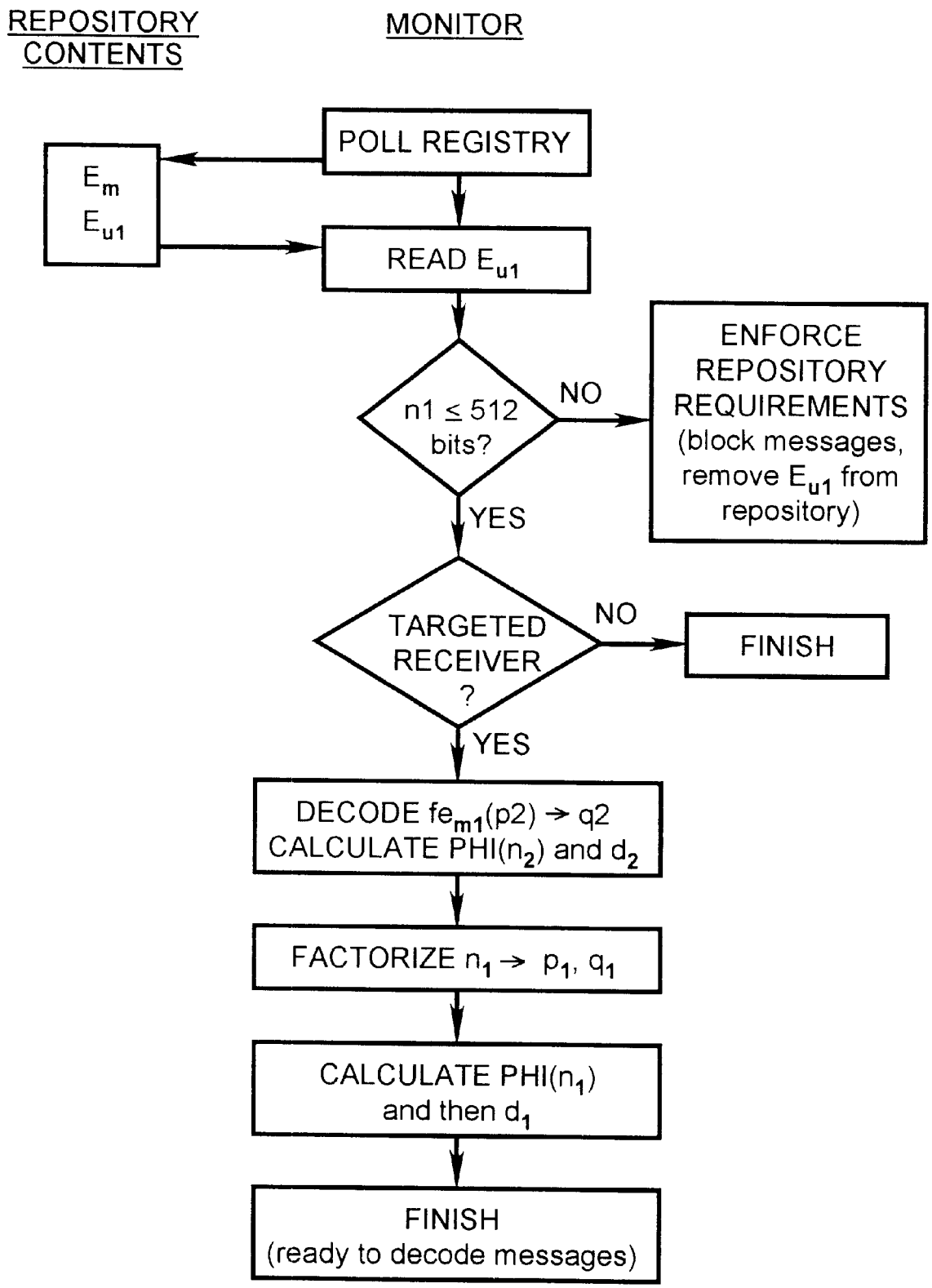
FIG. 8 is a flow chart illustrating a method of operation of the embodiment of FIG. 6.

FIG. 8 shows the steps of compliance checking by a monitoring authority under the nested public key system. The authority polls the registry to read a user's encoding key Eu1 and check its format. If the n1 term (for which the authority lacks any advantageous means to decode except for resource intensive methods) is noncompliant with the limitation that it be less than or equal to 512 bits, enforcement action is taken against the user. This may include remove the key from the repository and blocking messages to that user. If compliant, the authority determines whether the user is a targeted receiver, for instance when a court order permits or requires that the user's correspondence be monitored.

If the user is targeted, the authority may generate a decoding key to decode all future messages encoded with the encoding key. First, the authority decodes the term fEm(p2) to learn p2, making it trivial to determine the other factor q2 of the second phase of encryption and calculate phi(n2) and d2. Next, to break the first phase of encryption, the authority factorizes n1 into p1 and q1, a difficult process that is possible only because the size of n1 is limited by regulation of the monitoring authority. Once factorized, phi(n1) and d1 may readily be calculated. Any messages using the targeted public key may now be decoded by the authority.

Figure 9A:
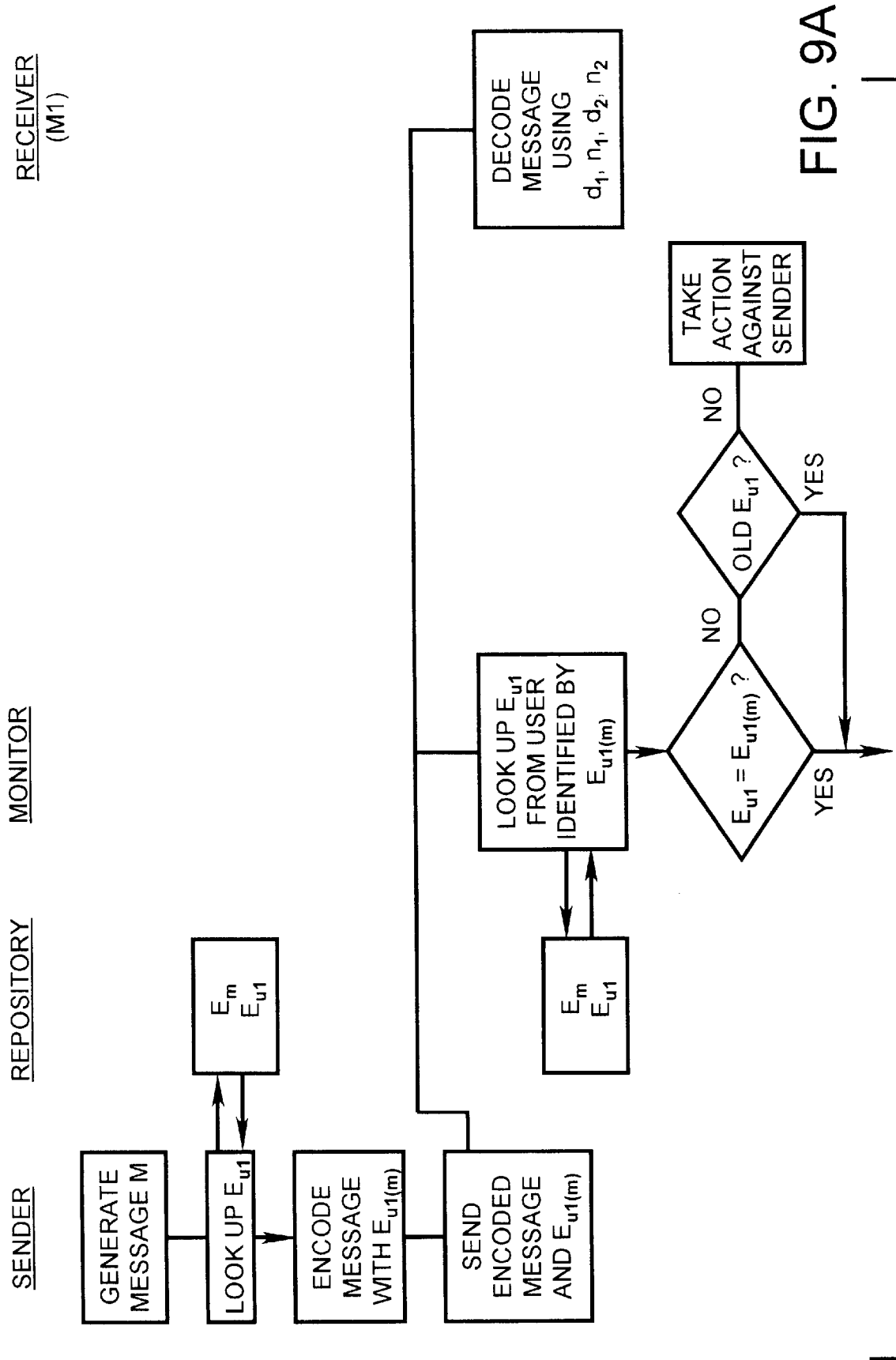
FIGS. 9A and 9B are a flow charts illustrating a method of operation of the embodiment of FIG. 6.
Figure 9B:
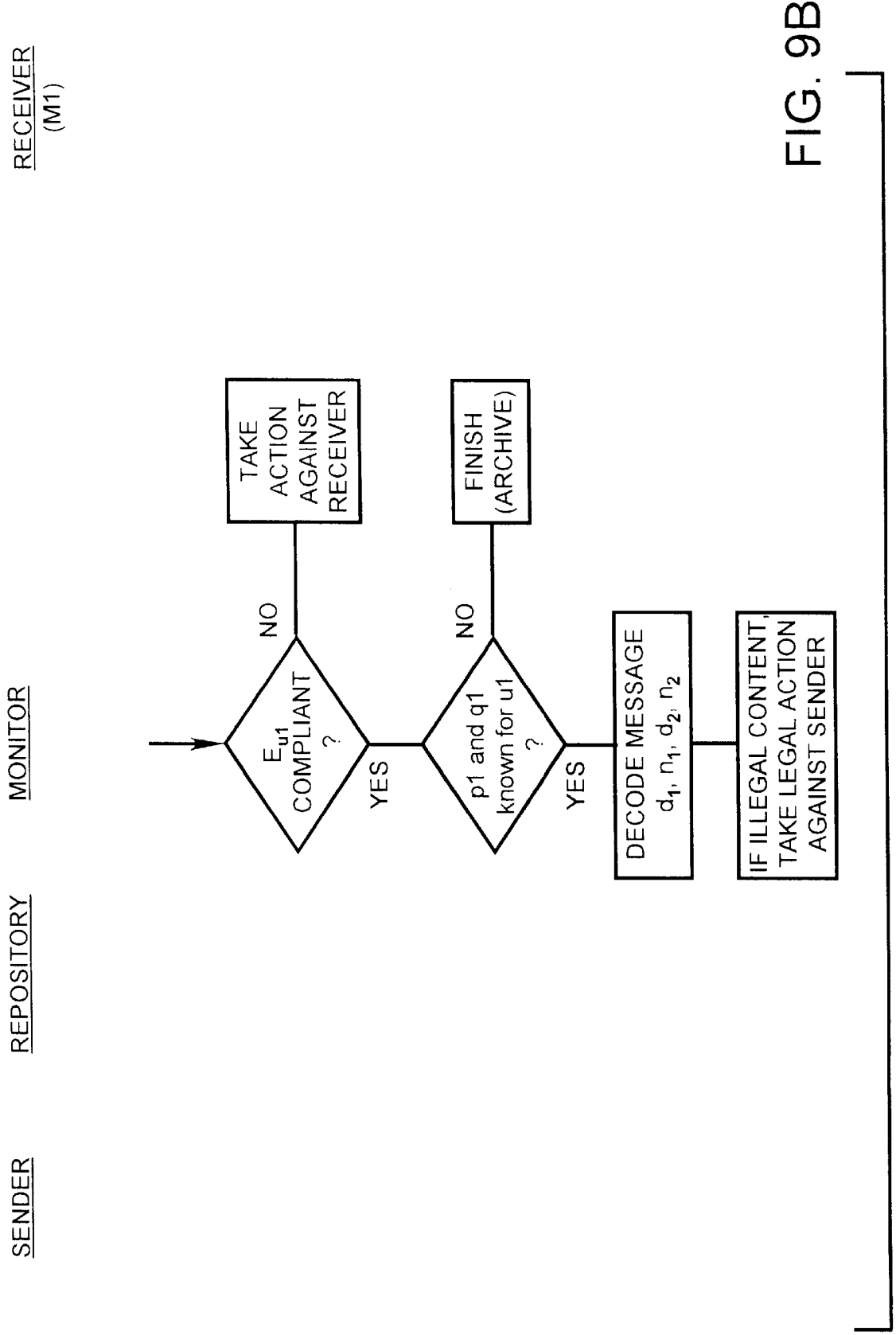

FIG. 9 shows the steps of generating, sending, monitoring, and receiving a message m. As with the process of FIG. 5 discussed above, the sender generates message m, looks up the encoding key Eu1 of the recipient and encodes the message by the nested process discussed above with respect to this alternative embodiment. It is not essential which stage of nested encryption is used first to generate the intermediate encrypted message, except that a convention should be followed or a key should indicate the preferred method to avoid failed attempted in the wrong order by the receiver (or monitoring authority). The message is sent, accompanied by the key Eu1(m) actually used.

Figure 5:
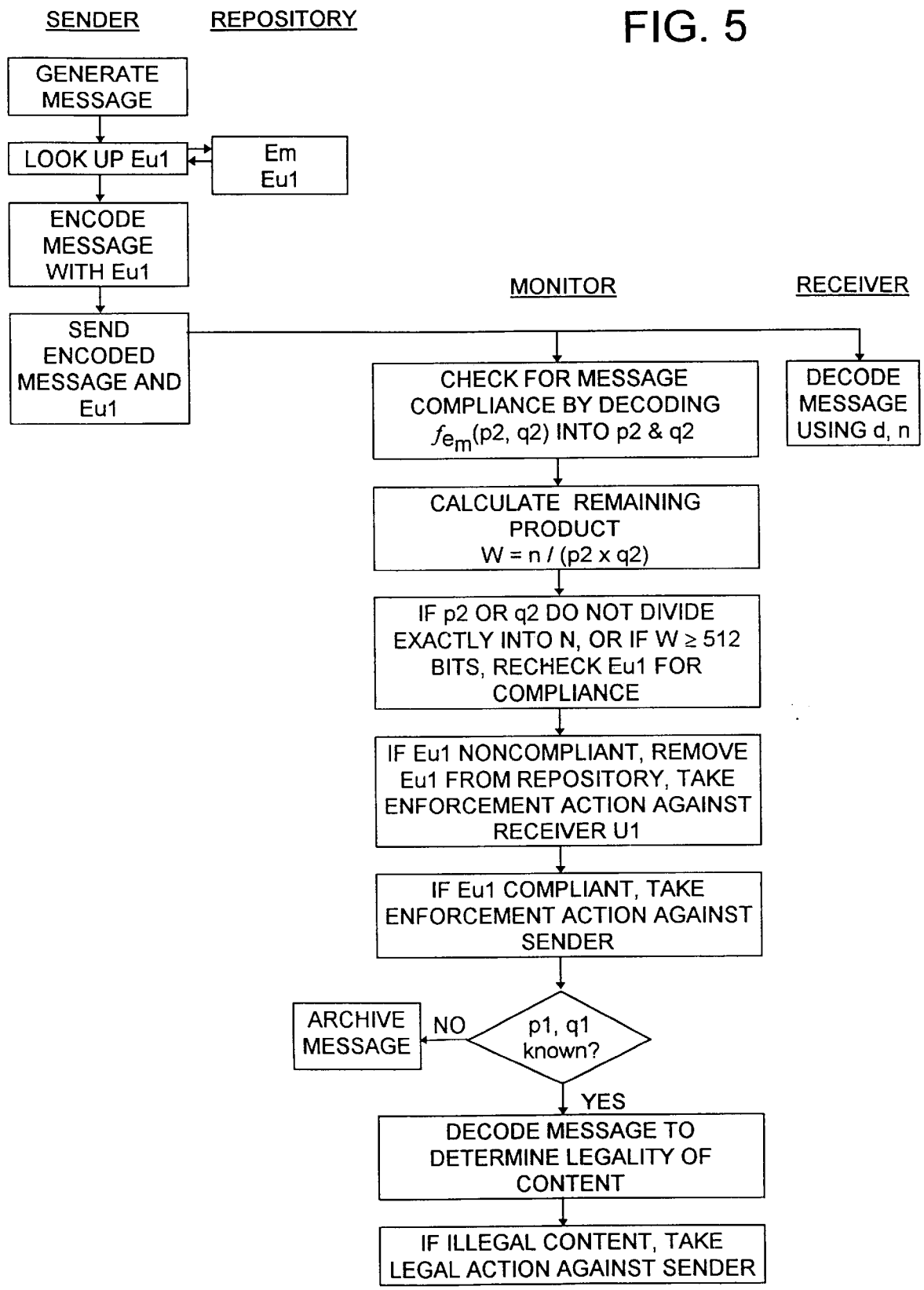
FIG. 5 is a flow chart illustrating a method of operation of the embodiment of FIG. 1

Compliance checking is simpler in the method of FIG. 9 than in the method of FIG. 5. The authority, upon intercepting or noting the transmission of the encrypted message first checks to ensure that the encoding key Eu1(m) used is an approved listed key by looking up the key Eu1 of the recipient. If this does not match the key used Eu1(m), then the authority checks whether the key used might match a recent former compliant key of the recipient. If not, the authority may take enforcement action against the sender for using an unauthorized or noncompliant key. If the sender is using an old approved key, he may be informed or warned of the need to use the current key.

If the key matches the appropriate key in the registry, the authority looks at the key to determine if the n1 portion of the key is compliant with the size requirement, and less than or equal to the legal limit of 512 bits. If not, the authority takes enforcement action against the receiver.

If the n1 portion of the key is compliant and decoding by the authority is required, the authority determines whether the key has already been decoded by prior calculation of p1 and q1. If not, and there is no current need to decode the message, the message may be archived for possible future decoding. If the key has not previously been decoded, and decoding of the message is needed, p1 and q1 may be obtained by factorization of n1 as shown in FIG. 8. Then d1 may be obtained and the message may be decoded by using d1, n1, d2, and n2. If the content of the message is illegal, the authority may take action against the sender.

In this embodiment, both phases of the encryption use RSA public key cryptography. However, one or both of these may use alternative public key methods such as elliptical algorithms, as long as the information in the public key which is encrypted with the authority's public key, can be used to obtain the corresponding private key, and preferably in such a manner as to verify that the private key does indeed correspond to the public key.

Mathematical Details of the Additional Alternative Embodiment

In the nested embodiment using the RSA algorithm, the receiver picks two different large random prime numbers, p and q, and their product n=p1*q1. He then uses the function:

$$\text{EulerPhi}(n) = (p-1)*(q-1).$$

Next, the algorithm picks a value "e" and finds "d" such that (d*e mod EulerPhi(n))=1 (using a modified Euclid's algorithm). Then, the public key is {n,e}, and the private key is {n,d}, so that to encrypt a message m:

$$m\_\text{encrypted} = (m^e) \bmod n$$

Thus, the decrypted message consists of:

$$m = (m\_\text{encrypted}^d) \bmod n$$

This yields the original message. If "d2" (the "d" for the unrestricted public key which is encoded into "g") is provided to the monitoring authority, the authority would have more difficulty in proving that the "d" does indeed belong with {m,e}, or worse, if they didn't have to derive d, might neglectfully fail to check for this. Instead, it is preferable to provide the value of one of the primes, say p2. Then, the monitoring authority can divide to obtain q2 and all the other values required, including d2. If p2 does not divide exactly into n, then the message is determined to be in violation of decodability rules.

Corresponding strategies for compliance checking could be developed for other public key systems.

The extra "g" part is unreadable by anyone except the monitoring authority (assuming they use a large and secure key, and have appropriate physical security). Normal message sending does not involve g other than the sender encapsulating the receiver's public key (with "g" in it) with the message sent, so that the monitoring authority can store the entire "message-with-key" and decode it later if they choose, without having to look up the repository key of the receiver (which would allow the receiver later to change his own key without causing the monitoring authority additional decoding problems).

The repository contains all the public keys under the jurisdiction of the monitoring authority, so the latter can poll all those keys under its jurisdiction to establish whether the "g" part of each key arithmetically corresponds to the unrestricted-size public key part, both of which are embedded within each public key.

Any violating keys could be removed from the repository, with appropriate action against the receiver.

If the receiver is targeted for complete decoding, then the monitoring authority can go further and break the restricted-size public key of the receiver. It can then immediately decode all subsequent messages intended for the receiver.

The monitoring authority, on receipt of a message, can look at the receiver address, and establish whether the receiver is targeted for complete decoding. If not, the monitoring authority may simply wish to establish that the public key used is current when the message is sent, or merely that "g" is self-consistent with the unrestricted public key, allowing it to take appropriate action.

If the receiver is targeted by the monitoring authority, the latter should already have decoded the restricted-size part of the public key as described above, so immediate original message decoding is possible.

While described in terms of preferred and alternative embodiments, the invention is not intended to be so limited.

I claim:

1. A method of generating a public key comprising the steps:

generating a first key portion by performing a mathematical operation on a first data set;

generating a second key portion by performing a mathematical operation on a second data set;

looking up a public key of a monitoring authority;

generating a third key portion by using the public key of the monitoring authority to encode at least some of the second data set, such that the monitoring authority decrypts messages encoded with the second key portion.

2. The method of claim 1 wherein at least one of the first key portion and the second key portion is the product of at least two prime numbers.

3. The method of claim 2 wherein the third key portion includes an encoded identity of at least one of the prime numbers.

4. The method of claim 1 wherein at least one of generating the first key portion and generating the second key portion includes employing an elliptical algorithm.

5. A method of encrypted communication comprising the steps:

creating a message;

looking up a public key of a recipient;

encoding the message via a first encoding process using a first portion of the public key to generated an intermediate encoded message;

encoding the intermediate encoded message via a second encoding process using a second portion of the public key to generate a final encoded message; and sending the final encoded message to a recipient.

6. The method of claim 5 including the recipient:

receiving the final encoded message;

decoding the final encoded message to generate the intermediate encoded message;

decoding the intermediate encoded message to generate the final decoded message.

7. The method of claim 5 wherein at least one of the steps of encoding the message via a first encoding process and encoding the intermediate encoded message via a second encoding process includes using an elliptical encryption algorithm.

8. The method of claim 5 wherein at least one of the steps of encoding the message via a first encoding process and encoding the intermediate encoded message via a second encoding process includes using a multiple prime algorithm.

9. The method of claim 5 wherein the steps of encoding the message via a first encoding process and encoding the intermediate encoded message via a second encoding process include using different encryption algorithms.

10. A cryptographic communications system comprising:

a communications network;

a sender terminal connected to the network;

a receiver terminal connected to the network;

a first monitoring authority terminal connected to the network;

a public key repository connected to the network;

the repository containing a first data sequence comprising a receiver encoding key and a second data sequence comprising a first monitoring authority encoding key, the receiver encoding key comprising a first key portion, a second key portion, and a third key portion, the first key portion being a functional result of a first data set, the second key portion being a functional result of a second data set, the third key portion comprising a numerically encoded result of a mathematical function of the first monitoring authority encoding key and at least a selected portion of the second data set, such that the first monitoring authority decrypts a message encoded with the second key portion.

11. The system of claim 10 wherein the second key portion includes the product of two prime numbers and the third key portion includes the encoded identity of at least one of the prime numbers.

12. The system of claim 10 wherein the first key portion is less than a preselected size established by the monitoring authority.

13. The system of claim 10 including a second monitoring authority terminal connected to the communication line, and wherein the public key repository includes a second monitoring authority public key, and wherein the receiver encoding key includes a fourth encoding key portion comprising a numerically encoded result of a mathematical function of the second monitoring authority encoding key and at least a selected portion of the second data set, such that the second monitoring authority decrypts a message encoded with the second key portion.

14. The system of claim 10 wherein the first monitoring authority is a first governmental body having authority over the jurisdiction in which the sender terminal is located, and the second monitoring authority is a second governmental body having authority over the jurisdiction in which the receiver terminal is located.

* * * * *